United States Patent
Oh et al.

(10) Patent No.: US 11,648,933 B2
(45) Date of Patent: *May 16, 2023

(54) METHOD FOR CONTROLLING WHEEL SLIP OF VEHICLE

(71) Applicants: Hyundai Motor Company, Seoul (KR); Kia Motors Corporation, Seoul (KR)

(72) Inventors: Ji Won Oh, Gyeonggi-do (KR); Jeong Soo Eo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 394 days.

This patent is subject to a terminal disclaimer.

(21) Appl. No.: 16/929,842

(22) Filed: Jul. 15, 2020

(65) Prior Publication Data
US 2021/0031750 A1    Feb. 4, 2021

(30) Foreign Application Priority Data
Jul. 30, 2019    (KR) .......................... 10-2019-0092527

(51) Int. Cl.
  *B60W 30/02*    (2012.01)
  *B60W 40/10*    (2012.01)
  *B60W 50/02*    (2012.01)

(52) U.S. Cl.
  CPC ............ *B60W 30/02* (2013.01); *B60W 40/10* (2013.01); *B60W 50/0205* (2013.01);
  (Continued)

(58) Field of Classification Search
  CPC .. B60W 30/02; B60W 40/10; B60W 50/0205; B60W 2552/05;
  (Continued)

(56) References Cited

U.S. PATENT DOCUMENTS 5,163,530 A * 11/1992 Nakamura ............. B60W 10/11
                                                                  180/197
11,332,143 B2 *  5/2022 Oh ........................ B60W 10/08
(Continued)

OTHER PUBLICATIONS

K. Berntorp, "Joint Wheel-Slip and Vehicle-Motion Estimation Based on Inertial, GPS, and Wheel-Speed Sensors," in IEEE Transactions on Control Systems Technology, vol. 24, No. 3, pp. 1020-1027, May 2016, doi: 10.1109/TCST.2015.2470636. (Year: 2016).*

*Primary Examiner* — Jeff A Burke
*Assistant Examiner* — Joshua Alexander Garza
(74) *Attorney, Agent, or Firm* — Fox Rothschild LLP

(57) ABSTRACT

A method for controlling wheel slip of a vehicle includes: observing and estimating equivalent inertia information of a driving system in real time based on operation information of the driving system by receiving the operation information of the driving system for driving the vehicle; calculating the compensated amount for compensating a torque command of a driving device from the equivalent inertia information of the driving system observed and estimated by a controller; compensating the torque command of the driving device by using the calculated compensated amount; and performing a control of a torque applied to a driving wheel according to the compensated torque command.

16 Claims, 5 Drawing Sheets

(52) U.S. Cl.
CPC .............. *B60W 2510/0638* (2013.01); *B60W 2510/081* (2013.01); *B60W 2510/104* (2013.01); *B60W 2510/1015* (2013.01); *B60W 2520/26* (2013.01); *B60W 2520/28* (2013.01); *B60W 2552/05* (2020.02)

(58) Field of Classification Search
CPC ... B60W 2510/0638; B60W 2510/081; B60W 2510/1015; B60W 2510/104; B60W 2520/26; B60W 2520/28
See application file for complete search history.

(56) References Cited

U.S. PATENT DOCUMENTS

| | | | | |
|---|---|---|---|---|
| 2005/0150702 | A1* | 7/2005 | Matsuzaki | B60W 30/18172 180/242 |
| 2008/0264709 | A1* | 10/2008 | Fenker | B60W 30/18172 180/197 |
| 2010/0204887 | A1* | 8/2010 | Ichinose | B60L 15/2036 701/41 |

* cited by examiner

METHOD FOR CONTROLLING WHEEL SLIP OF VEHICLE

CROSS-REFERENCE TO RELATED APPLICATION

This application claims under 35 U.S.C. § 119(a) the benefit of Korean Patent Application No. 10-2019-0092527 filed on Jul. 30, 2019, the entire contents of which are incorporated herein by reference.

BACKGROUND

(a) Technical Field

The present disclosure relates to a method for controlling wheel slip of a vehicle, more particularly, to the method for controlling wheel slip, which may control wheel slip of a vehicle wheel without using a reference speed of the vehicle, while utilizing a maximum frictional force of a tire friction source regardless of a road condition and the amount of steering wheel rotation, thereby securing stability and performance of the vehicle.

(b) Description of the Related Art

A vehicle may be equipped with various types of electronic control systems for improving safety, such as: an Anti-lock Brake System (ABS) which prevents the locking of a brake lock caused by wheel slip on a slippery road surface when the vehicle is braked, a Traction Control System (TCS) which controls a driving force or a braking force when the vehicle suddenly starts up or suddenly accelerates, thereby preventing the wheel slip, an Electronic Stability Program (ESP) for stably controlling the posture of the vehicle, or the like.

For example, the TCS is an active safety device which prevents excessive slip of a driving wheel when the vehicle starts up or accelerates on a low friction road or an asymmetric road to prevent vehicle spin, and improves the start-up and acceleration performance of the vehicle, and the steering stability.

If an excessive driving force is generated when the vehicle starts up or accelerates on a slippery road surface to cause phenomena of the wheel slip and the like, the TCS controls the speed of the driving wheel by controlling the driving force (driving torque) or the braking force (braking torque) of the vehicle, thereby optimizing acceleration of the vehicle.

Here, the driving force of the vehicle may mean a torque which is output by a vehicle driving source, and the vehicle driving source may be a motor (pure electric vehicle or fuel cell vehicle), an engine (internal combustion engine vehicle), or a motor and an engine (hybrid vehicle).

For example, a motor-driven vehicle such as a pure electric vehicle, a fuel cell vehicle, or a hybrid vehicle determines a target driving wheel speed at which the driving wheel may exert an optimum driving force depending upon the amount of slip generated between the driving wheel and the road surface, the friction coefficient of the road surface, or the like, and controls the motor torque so as to follow the target driving wheel speed.

By reducing the motor torque in order to prevent instability of the vehicle when the vehicle turns on a corner road, it is possible to allow the vehicle to turn safely.

In operation, the TCS adjusts the torque in a direction of reducing a slip by calculating the slip of the vehicle wheel based on the actual vehicle speed during traveling, and it is necessary to know the actual vehicle speed and the vehicle wheel speed, which are real-time information, in order to calculate the slip of the vehicle wheel.

For example, a slip rate ($\lambda$) of the vehicle wheel may be calculated as follows.

$$\lambda(\%) = (Vveh - Vwhl/Vveh) \times 100$$

The variable 'Vveh' refers to a vehicle speed, that is, the vehicle body speed, which becomes a reference speed required for calculating the slip rate, and this reference speed means the vehicle speed in a state having no slip, and is essential for operation of the TCS.

The variable 'Vwhl' refers to a vehicle wheel speed (wheel speed), which is measured by a wheel speed sensor.

As described above, since the reference speed is essential for the operation of the TCS, accurate estimation of the reference speed is required to implement accurate and proper control performance.

Generally, the reference speed may be the vehicle wheel speed of the non-driven wheel, or obtained by using a G sensor for detecting the longitudinal acceleration, and a yaw rate sensor is also used to compensate the reference speed.

Meanwhile, even though various electronic control systems have been introduced into the vehicle, the behavior of the vehicle is finally limited by the limitation of the road frictional force.

This is because the behavior of the vehicle depends on the frictional force between the tires and the road surface, and accordingly, how effectively the friction force is used becomes an important factor in determining the behavior of the vehicle.

The maximum road surface frictional force is compositely influenced by the characteristics of the road surface, longitudinal/transverse tire slips, tire vertical loads, or the like, and typically, as the amount of slip increases, the available frictional force decreases.

Accordingly, it is important to maintain effective longitudinal/transverse frictional forces by limiting the tire slip of the vehicle wheel, and this is carried out by the electronic control system such as ABS or TCS.

However, known ABS or TCS control methods typically have difficulty in maintaining the ideal control performance due to a control cycle delay or a wheel speed signal processing for preventing malfunction, thereby not maintaining the slip condition which produces the maximum road surface frictional force, and thus causing a significant slip.

As a result, a low frictional force is used without using the maximum road surface frictional force in a limited situation because of tire characteristics that the frictional force of the tire is lower than the maximum road surface frictional force in a situation where the tire slip rate of the vehicle wheel is high, thereby not effectively exerting stability and performance of the vehicle.

The above information disclosed in this Background section is only for enhancement of understanding of the background of the disclosure and accordingly it may contain information that does not form the prior art that is already known in this country to a person of ordinary skill in the art.

SUMMARY

Accordingly, the present disclosure provides a method for controlling wheel slip, which may control wheel slip of a vehicle wheel without using a reference speed in a vehicle, and use the maximum frictional force in a tire friction source at all times regardless of a road surface condition and the amount of steering wheel rotation, thereby securing stability and performance of the vehicle.

An exemplary embodiment of the present disclosure provides a method for controlling wheel slip of a vehicle including: observing and estimating equivalent inertia information of a driving system in real time based on operation information of the driving system by receiving the operation information of the driving system for driving a vehicle in an equivalent inertia observer of a controller while the vehicle travels; calculating, by the controller, a compensated amount for compensating a torque command of a driving device from the equivalent inertia information of the driving system which is observed and estimated by the equivalent inertia observer; compensating, by the controller, the torque command of the driving device by using the calculated compensated amount; and performing, by the controller, a control of a torque applied to a driving wheel according to the compensated torque command.

Accordingly, according to the method for controlling the wheel slip of the vehicle according to the present disclosure, it is possible to perform the wheel slip control of the vehicle wheel without using the reference speed, and to use the maximum frictional force in the tire friction source at all times regardless of the road surface condition and the amount of steering wheel rotation, thereby securing stability and performance.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given herein below by way of illustration only, and thus are not limitative of the present disclosure, and wherein.

Figure 1:
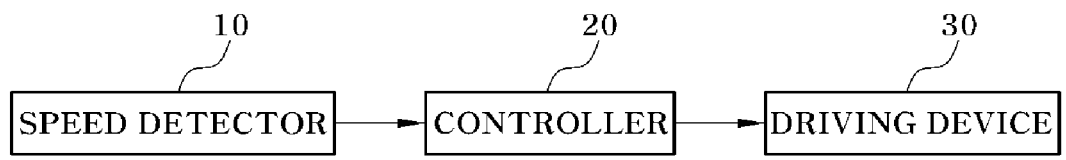
FIG. 1 is a block diagram schematically illustrating a configuration of a system which performs wheel slip control according to the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent sections of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings so that those skilled in the art may easily carry out the present disclosure. However, the present disclosure is not limited to the embodiments described herein and may also be embodied in other forms.

The present disclosure relates to a method for controlling wheel slip of a vehicle, and capable of effectively controlling wheel slip of a vehicle by using a vehicle wheel speed of a non-driven wheel or without using a reference speed which may require a complicated calculation.

Particularly, the present disclosure relates to a method for controlling wheel slip based on an equivalent inertia observer of a vehicle, including controlling the wheel slip of the vehicle by compensating a driving force command (torque command) for a driving device by using equivalent inertia information which is estimated by the observer set in a controller.

Further, the present disclosure relates to a control method capable of preemptively limiting the wheel slip in a transient section before the existing TCS control or wheel slip control is operated.

Further, the present disclosure relates to a method for controlling wheel slip which is useful for a motor-driven vehicle such as an eco-friendly vehicle, that is, a Battery Electric Vehicle (BEV), a hybrid vehicle (Hybrid Electric Vehicle, HEV), or a fuel cell vehicle (Fuel Cell Electric Vehicle, FCEV), which uses a motor as a vehicle driving source, that is, a driving device which drives the vehicle.

That is, the method for controlling the wheel slip according to the present disclosure performs a real-time, immediate, and instantaneous driving force control for the driving device by using the equivalent inertia information for suppressing or limiting the wheel slip as described later, thereby being useful for the vehicle which mounts the motor having a faster control responsiveness as compared to the engine as the vehicle driving device.

The known TCS calculates the amount of slip (or slip rate) of the driving wheel which corresponds to a difference between the reference speed and the vehicle wheel speed by using the reference speed and the vehicle wheel speed (driving wheel speed), and adjusts the torque (may be a driving torque or a braking torque) in a direction of decreasing the amount of slip.

On the other hand, the present disclosure estimates the equivalent inertia information of the driving system in an observer based on operation information of the driving system without using the reference speed, and adjusts a torque in a direction of increasing the equivalent inertia by using the estimated value.

Here, the operation information of the driving system may include a driving force command (torque command) of a previous control cycle for the driving device and speed information of the driving system.

As described above, the present disclosure controls the wheel slip by adjusting the driving force based on the equivalent inertia information without using the vehicle speed, which is the reference speed, and according to this method, it is possible to secure fast responsiveness in the transient section.

Hereinafter, exemplary embodiments of the present disclosure will be described in more detail with reference to the drawings.

In the following description of the exemplary embodiment, the driving force refers to the output of the driving device, that is, the torque (driving torque) when the driving device drives, and since the present disclosure is applicable even when the driving device is regenerated, the driving force may be replaced with the regenerative force or the braking force, where the torque refers to the braking torque.

Figure 2:
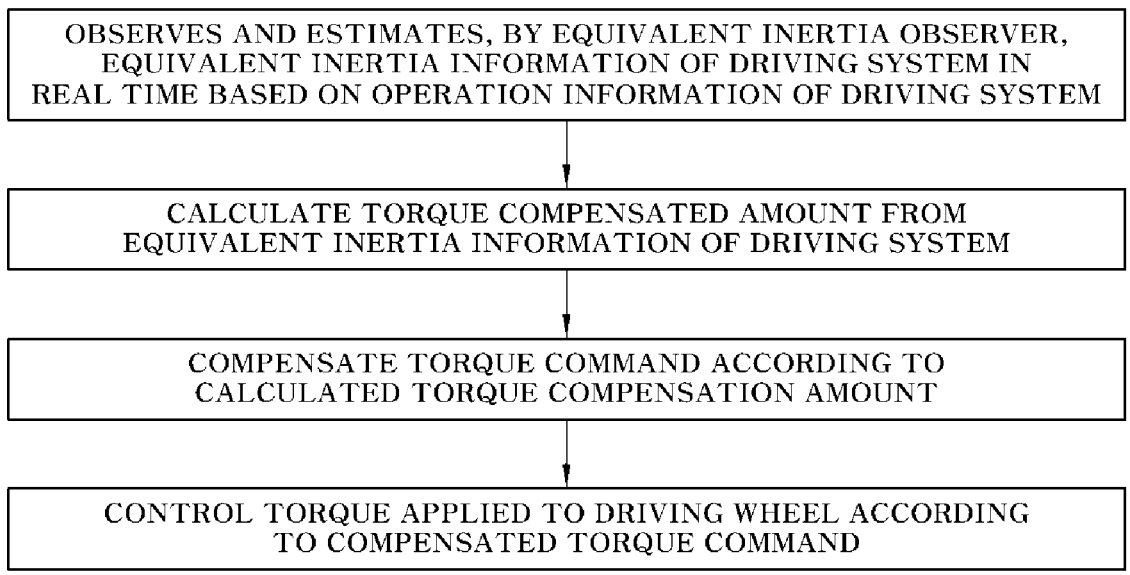
FIG. 2 is a flowchart illustrating a wheel slip control process of a vehicle according to the present disclosure.

FIG. 1 is a block diagram schematically illustrating a configuration of a system which performs wheel slip control according to the present disclosure, and FIG. 2 is a flowchart illustrating a wheel slip control process of a vehicle according to the present disclosure.

As illustrated in FIG. 1, a system which performs wheel slip control according to the present disclosure includes a speed detector 10 which detects a speed of a driving system, a controller 20 which receives speed information of the driving system detected by the speed detector 10 to generate a compensated torque command for the wheel slip control, and a driving device 30 which is operated according to the compensated torque command generated and output by the controller 20.

In the present disclosure an equivalent inertia observer (not illustrated) within the controller 20 estimates equivalent inertia information of the driving system by using the speed information of the driving system which is detected by the speed detector 10, and the controller 20 compensates the torque command (driving force command) based on the equivalent inertia information of the driving system estimated by the observer.

Here, the speed of the driving system may be a rotational speed of a driving element which exists in a path where the driving force is transferred from the driving device 30 which drives the vehicle to a driving wheel (not illustrated), or may mean a rotational speed related to other driving wheel speeds, which is the real-time rotational speed information of the driving system detected by the speed detector 10 as a measured value.

As an example, the speed of the driving system for estimating the equivalent inertia information may be the speed of the driving wheel which is connected to the driving device 30, the rotational speed of the driving device 30, the rotational speed of a transmission input shaft or the rotational speed of a transmission output shaft, or the like.

In the present disclosure, when the speed of the driving system is the speed of the driving wheel, the speed detector 10 may be a wheel speed sensor which is installed in the corresponding driving wheel.

Alternatively, in the present disclosure, when the speed of the driving system is the rotational speed of the driving device 30, the speed detector 10 may be a known engine RPM sensor which detects an engine speed or a known resolver for detecting a motor speed.

Alternatively, the speed of the driving system may also be the rotational speed of an Integrated Starter and Generator (ISG), which is a starter generator connected to the engine, and in the present disclosure, may be used as the speed of the driving system for estimating the equivalent inertia information when the speed of the driving system is the rotational speed related to the driving wheel speed.

Further, a torque control for limiting the equivalent inertia-based wheel slip is performed by the controller 20; the controller 20 may perform a known TCS control or wheel slip control; and the controller may refer to a single controller or a plurality of controllers which perform a cooperative control.

Further, in the present disclosure, the controller 20 that includes functions of both a vehicle controller which is an upper controller and a motor controller which is a lower controller, which perform a cooperative control in the vehicle.

In the present disclosure, the controller 20 generates a primary torque command (driving force command) which is required for the vehicle to travel depending upon an operating input or a cruise mode input of the driver in a general method.

Further, the controller 20 estimates the equivalent inertia information of the driving system from the operation information of the driving system through the equivalent inertia observer, and calculates the torque compensated amount (driving force compensated amount) for the wheel slip control based on the estimated equivalent inertia information.

Subsequently, the controller 20 compensates the primary torque command by using the calculated torque compensated amount, and controls the operation of the driving device 30 with the compensated torque command so that the compensated torque may be applied to the driving wheel.

The driving device 30 may be an engine or a motor as a driving source which drives the vehicle, and in the present disclosure, the torque command may be an engine torque command or a motor torque command.

In the present disclosure, the operation information of the driving system used to estimate the equivalent inertia information, as described above, may include the final torque command of the driving device 30 and the real-time speed information of the driving system.

Here, the final torque command is the torque command of the previous control cycle, and when the torque is compensated based on the equivalent inertia information in the previous control cycle, the compensated torque command becomes the final torque command.

The real-time speed information of the driving system is the speed which is detected by the speed detector 10.

Further, in calculating the torque compensated amount for the compensation based on the equivalent inertia information estimated by the observer, the torque compensated amount may be calculated by using real-time change amount information of the equivalent inertia and a compensation gain obtained from the observer.

Here, the real-time change amount information of the equivalent inertia may be a difference between the real-time equivalent inertia of the driving system and a predetermined basic equivalent inertia.

Further, the present disclosure compensates the primary torque command by using the torque compensated amount, and if the torque compensated amount is obtained when the torque compensated amount is defined as a positive value, the compensated torque command may be obtained and generated as a value obtained by subtracting the torque compensated amount from the torque command (pre-compensation torque command, that is, the primary torque command).

In the present disclosure, the compensation of the torque refers to decreasing the torque generated by the driving device 30 to be applied to the driving wheel as compared to the pre-compensation.

As a result, when the compensated torque command compensated as described above is generated, a torque control which controls the driving device 30 is performed by targeting the compensated torque command.

Figure 3:
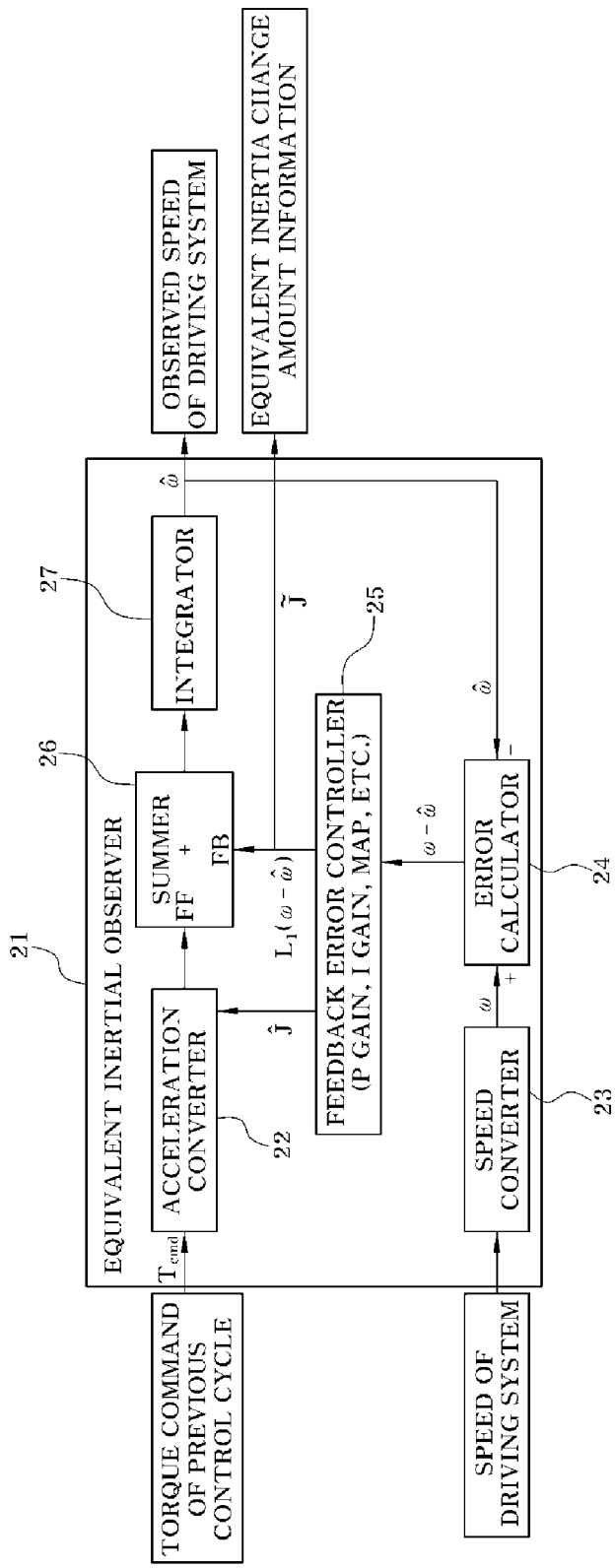
FIG. 3 is a block diagram schematically illustrating a configuration of an equivalent inertia observer in the present disclosure.

FIG. 3 is a block diagram schematically illustrating a configuration of an equivalent inertia observer according to the present disclosure, and the equivalent inertia observer will be described with reference to FIG. 3 as follows.

An equivalent inertia observer 21 may be provided in the controller 20, and as illustrated, receives the torque command (driving force command) of the previous control cycle and the speed of the driving system, which are the operation information of the driving system.

Here, the speed of the driving system is speed information detected by the speed detector 10 in real time.

In the following description, the speed of the driving system detected by the speed detector 10 to be input to the controller 20 is referred to as 'a measured speed of the driving system'.

In the present disclosure, the equivalent inertial observer 21 estimates the equivalent inertia information of the driving system and the speed of the driving system, as described herein, by receiving the torque command of the previous control cycle and the measured speed of the driving system, such that the equivalent inertia observer 21 outputs the equivalent inertia information of the driving system and the speed of the driving system as observed values.

In the present disclosure, the speed of the driving system among the observed values output by the equivalent inertial observer 21 may be used as feedback information in estimating equivalent inertia information of a next control cycle and the speed of the driving system in the equivalent inertia observer 21.

In the following description, the speed of the driving system, which is an observed value output by the equivalent inertia observer 21, is referred to as 'an observed speed of the observed speed of the driving system'.

The equivalent inertia information of the driving system estimated and output by the equivalent inertia observer 21 may be information representing a real-time equivalent inertia change amount of the driving system, that is, equivalent inertia change amount information, and the equivalent inertia change amount information may be an inverse equivalent inertia change amount. The inverse equivalent inertia change amount is defined as the inverse of the equivalent inertia change amount, and the equivalent inertia observer 21 estimates the inverse equivalent inertia change amount and the observed speed of the driving system from the torque command of the previous control cycle and the measured speed of the driving system, and at this time, the estimated observed speed of the driving system is used as feedback information as described above.

As illustrated in FIG. 3, the equivalent inertia observer 21 may be configured to include an acceleration converter 22, a speed converter 23, an error calculator 24, a feedback error controller 25, a summer 26, and an integrator 27.

As described above, the equivalent inertia observer 21 is configured to require two inputs, and the two inputs are information related to a Feedforward (FF) and a Feedback (FB), and one of the two input information is the torque command of the previous control cycle (final torque command) among the operation information of the driving system, and the other is the measured speed of the driving system received from the speed detector 10.

The equivalent inertia observer 21 basically uses the relationship of the following Equation 1, where the '$T_q$' refers to a torque, the 'I' refers to an equivalent inertia, and the '$\alpha$' refers to an angular acceleration which is a velocity (angular velocity) derivative value.

$$T_q = I \times \alpha \qquad \text{Equation 1}$$

In the present disclosure, the equivalent inertia observer 21 illustrated in FIG. 3 may estimate information of the inverse equivalent inertia (J), which is the inverse of the equivalent inertia (I), as the equivalent inertia information, and in particular, estimate the inverse equivalent inertia change amount as the equivalent inertia change amount information.

Further, as described above, the observed speed of the driving system may be obtained in the equivalent inertia observer 21.

The following Equations 2 and 3 are model equations used for observing and estimating the equivalent inertia information and the speed of the driving system after being input to and set in the equivalent inertia observer 21 in advance.

$$\dot{\hat{\omega}} = \hat{J} T_{cmd} + L_1(\omega - \hat{\omega}), \text{ where } \hat{J} = J^* + \tilde{J} \qquad \text{Equation 2}$$

$$\dot{\tilde{J}} = L_2(\omega - \hat{\omega}) \qquad \text{Equation 3}$$

In the Equations 2 and 3, the ˆ refers to an observed value and the ˙ refers to a derivative value.

Further, the J refers to the inverse equivalent inertia (inverse of the equivalent inertia); the $\hat{J}$ refers to the observed inverse equivalent inertia (variable); the J* refers to a predetermined basic inverse equivalent inertia value (constant), and the $\tilde{J}$ refers to the observed inverse equivalent inertia change amount (variable).

Further, the $\omega$ refers to the measured speed of the driving system; the $\hat{\omega}$ refers to the observed speed of the driving system; and in the Equation 2, the $T_{cmd}$ refers to the torque command after the compensation (which is the torque command of the previous control cycle).

The equivalent inertial observer 21 illustrated in FIG. 3 uses the converted wheel speed by converting the speed of the driving system detected by the speed detector 10 into the wheel speed by the speed converter 23, and the measured speed of the driving system (ω) in the Equations 2 and 3 may be referred to as a measured wheel speed which converts the speed detected by the speed detector 10 into the wheel speed.

Further, the $L_1$ and $L_2$ refer to observer feedback gains (proportional, integral).

As described above, in an exemplary embodiment of the present disclosure, the equivalent inertia observer 21 serves to observe the inverse equivalent inertia change amount (or inverse equivalent inertia) in real time, and the observed inverse equivalent inertia change amount ($\tilde{J}$) in the Equation 2 is an object to be observed by the equivalent inertia observer 21.

In an exemplary embodiment of the present disclosure, the equivalent inertia observer 21 may be basically designed based on the Equation 1, and in particular, designed based on a model equation having the form in which a feedback term is added to the Equation 1.

The Equation 3 serves to provide an integral feedback term to the Equation 2, and accordingly, the $L_2$ becomes a feedback gain.

The acceleration converter 22 in the equivalent inertia observer 21 may be provided to generate the feedforward information of the acceleration dimension from the torque command ($T_{cmd}$) of the previous control cycle to input the feedforward information to the summer 26, and may be designed to convert the torque into the wheel acceleration based on the models of the Equations 1 and 2.

In particular, the acceleration converter 22 is configured to receive the observed equivalent inertia information, that is, the observed inverse equivalent inertia ($\hat{J}$) value, from the feedback speed error information in the feedback error controller 25, and calculates the wheel acceleration ('$\hat{J}T_{cmd}$' in the Equation 1), which is the feedforward information, from the received torque command ($T_{cmd}$) of the previous control cycle and the received observed inverse equivalent inertia ($\hat{J}$) to input the wheel acceleration to the summer 26.

Further, the speed converter 23 receives the speed of the driving system which is detected by the speed detector (denoted by a reference numeral '10' in FIG. 1) to convert the speed of the driving system into the wheel speed (measured wheel speed) (ω), and the converted wheel speed (vehicle wheel speed) may also be referred to as the measured speed of the driving system.

The measured speed of the driving system which is input to the equivalent inertia observer 21 is required to be converted into a wheel speed unit by the speed converter 23 to be compared with the observed speed of the driving system (observed wheel speed), which is a feedback speed, in the error calculator 24.

As an example, when the engine speed is used as the speed of the driving system, the engine speed detected by the speed detector 10 is required to be converted into a value of the wheel speed unit (measured wheel speed) by using a gear ratio and a longitudinal reduction ratio of the transmission in the speed converter 23.

Likewise, when the motor speed is used as the speed of the driving system, the motor speed detected by the speed detector 10 is required to be converted into the wheel speed unit (measured wheel speed) by using the gear ratio or the reduction ratio of the transmission in the speed converter 23.

If the speed detector 10 is a wheel speed sensor which directly detects the wheel speed (vehicle wheel speed), the speed detector 10 may be eliminated.

The error calculator 24 receives the observed speed of the driving system ($\hat{\omega}$), which is the output of the equivalent inertia observer 21, as the feedback speed to calculate an error (ω−$\hat{\omega}$) between the measured speed of the driving system (ω), which is the measured wheel speed input from the speed converter 23, and the observed speed of the driving system ($\hat{\omega}$), which is the feedback speed.

That is, the error calculator 24 calculates the error between the measured wheel speed and the observed wheel speed, and the speed error (ω−$\hat{\omega}$) calculated by the error calculator 24 is input to the feedback error controller 25 as the feedback error.

The feedback error controller 25 calculates a feedback control value of the acceleration dimension for converging the speed error (ω−$\hat{\omega}$) calculated and inputted by the error calculator 24 to zero.

At this time, the feedback error controller 25 calculates a control value for compensating the speed error by receiving the speed error (ω−$\hat{\omega}$) calculated and input by the error calculator 24, and may be a controller which calculates and outputs a kind of a control value for making the speed error to zero.

The feedback control value output from the feedback error controller 25 may be defined as a value of '$L_1(\omega-\hat{\omega})$' obtained from the speed error (ω−$\hat{\omega}$) in the Equation 2.

The feedback control value ($L_1(\omega-\hat{\omega})$) obtained and output by the feedback error controller 25 is input to the summer 26.

In an exemplary embodiment of the present disclosure, the feedback error controller 25 may be a configuration of a P gain control, an I gain control, or a map-based control, or may also be a configuration of a control of their sum or the like, that is, a composite control in which these are composited in parallel.

Considering that a physical order exists between the control input, the control feedback, and the control target like the theoretical notion of the controller, the dimension of the feedback control input has the degree of freedom which does not have to be limited to the acceleration dimension depending upon the type of the controller used as in the equivalent inertia observer 21.

Accordingly, the summer 26 sums the wheel acceleration received as the feedforward information, that is, the wheel acceleration ($\hat{J}T_{cmd}$) converted from the torque in the acceleration converter 22, and the feedback control value ($L_1(\omega-\hat{\omega})$) obtained and input by the feedback error controller 25 as the feedback information to output the summed value to the integrator 27.

As a result, the integrator 27 calculates the speed by integrating the summed acceleration value, and the speed integrated and calculated by the integrator 27 becomes the observed wheel speed, which is the output of the equivalent inertia observer 21, that is, the observed speed of the driving system ($\hat{\omega}$).

As described above, the observed speed of the driving system ($\hat{\omega}$) integrated and calculated by the integrator 27 becomes the output of the equivalent inertia observer 21, and at the same time, internally becomes the feedback speed which is input to the error calculator 24 in order to calculate the speed error (ω−$\hat{\omega}$).

A The speed error (ω−$\hat{\omega}$) calculated by the error calculator 24 in the equivalent inertia observer 21 becomes an observer error, and the feedback error controller 25 becomes a configuration of receiving the observer error as a feedback input to calculate the feedback control value corresponding to the observer error.

Further, in the present disclosure, the feedback control value is used as a compensated value for compensating the wheel acceleration output by the acceleration converter 22, and the wheel acceleration may be compensated in a method for summing the wheel acceleration output by the acceleration converter 22 and the feedback control value which is the compensated value.

The wheel acceleration information output by the acceleration converter 22 in the equivalent inertia observer 21 is input to the summer 26, which is a compensator, as the feedforward acceleration information, and at the same time, when the feedback control value output by the feedback error controller 25 is input to the summer 26 as the feedback acceleration information, the summer 26 sums the wheel acceleration, which is the feedforward acceleration value, and the feedback control value of the feedback error controller 25.

Further, when the summer 26 outputs the summed wheel acceleration (observed acceleration of the driving system) to the integrator 27, the integrator 27 integrates the wheel acceleration received from the summer 26 to calculate the wheel speed ($\hat{\omega}$).

Meanwhile, the feedback error controller 25 estimates and outputs the inverse equivalent inertia change amount based on the Equation 3, and the estimated inverse equivalent inertia change amount becomes the observed inverse equivalent inertia change amount ($\tilde{J}$), which is another output of the equivalent inertia observer 21.

Further, the feedback error controller 25 may obtain the observed inverse equivalent inertia ($\hat{J}$) by using the relationship of '$\hat{J}=J^*+\tilde{J}$' from the predetermined basic inverse equivalent inertia ($J^*$) as a constant and the observed inverse equivalent inertia change amount ($\tilde{J}$), and the observed inverse equivalent inertia ($\hat{J}$) is used to be input to the acceleration converter 22 to convert the torque command ($T_{cmd}$) of the previous control cycle into the wheel acceleration in the acceleration converter 22.

As a result, the inverse equivalent inertia change amount estimated by the equivalent inertia observer 21, that is, the observed inverse equivalent inertia change amount ($\tilde{J}$) is used to compensate the torque command in the controller 20, where the pre-compensation torque command is a normal torque command which is generated, by the controller 20, for traveling of the vehicle depending upon an operating input or a cruise mode input of the driver.

The controller 20 performs the compensation in the direction of decreasing the pre-compensation torque command, and when the torque compensated amount is defined as a positive (+) value, the post-compensation torque command becomes a value obtained by subtracting the torque compensated amount from the pre-compensation torque command.

The following Equation 4 is a torque compensation equation for obtaining a final torque command compensated by the controller 20.

$$T_{cmd}=T_{ff}-[K_pL_1(\omega-\hat{\omega})+K_t\tilde{J}sgn(T_{ff})]$$ Equation 4

The variable $T_{cmd}$ refers to the final torque command as the post-compensation torque command; the variables $K_p$ and $K_i$ refer to torque compensation gains (proportional, integral); and the variable $T_{ff}$ refers to the pre-compensation torque command.

Further, the variable sgn(x) refers to a function representing a value of +1 when x>0, and a value of −1 when x<0.

As may be seen from the Equation 4, the torque compensated amount is set by a function of the speed error ($\omega-\hat{\omega}$) of the observed speed of the driving system and measured speed of the driving system which are obtained from the equivalent inertia observer 21.

In particular, the controller 20 may determine the torque compensated amount by using a function of the speed error ($\omega-\hat{\omega}$) obtained by the equivalent inertial observer 21, and the observed inverse equivalent inertia change amount ($\tilde{J}$), which is the equivalent inertia information observed in the equivalent inertia observer 21.

At this time, the controller 20 sets each specific gravity through the P gain ($K_p$) and the I gain ($K_i$) in determining the torque compensated amount by using the function of the speed error ($\omega-\hat{\omega}$) and the observed inverse equivalent inertia change amount ($\tilde{J}$).

In the aforementioned description, although it has been described that the equivalent inertia information in the equivalent inertia observer 21 and the equivalent inertia information when the torque is compensated are the inverse equivalent inertia and the inverse equivalent inertia change amount, which are the inverse thereof, the inverse equivalent inertia in the aforementioned description may also be replaced with an equivalent inertia value or may also be applied by being equally replaced with an error value of the equivalent inertia value, a squared value of the equivalent inertia value, or the like.

Further, the present disclosure may set an upper limit value, which is a limited value of the observed equivalent inertia value in the controller 20, and the upper limit value may be set as an equivalent inertia value based on a maximum acceleration on a flat road.

If the object to be observed in the present disclosure is the inverse of the equivalent inertia rather than the equivalent inertia value, that is, the inverse equivalent inertia value, a lower limit value is required to be set as the limited value, and the lower limit value may be set as the inverse value of the equivalent inertia value of the vehicle based on the maximum acceleration on the flat road.

Further, the present disclosure may set the wheel slip recognition condition of the controller 20 or the torque command compensation performance condition for limiting the wheel slip by using the function of the feedback error of the equivalent inertia observer 21, that is, the speed error ($\omega-\hat{\omega}$).

That is, when the speed error ($\omega-\hat{\omega}$) value of the equivalent inertia observer 21 is a setting value or more, or when the speed error value is out of a predetermined setting range, the controller 20 determines and recognizes that the corresponding driving wheel is in a slip state to set to perform the torque compensation.

Further, in the present disclosure, the controller 20 may apply a sign function to limit the gradient (rate) of the torque compensated amount even in the case of the feedback error (that is, speed error) when determining the torque compensated amount as in the Equation 4.

In particular, it is possible to limit the decreasing level of the torque compensated amount even when the speed error, which is the feedback error signal, is a positive (+) value, and to release the limitation of the decreasing level of the torque compensated amount when the speed error is a negative (−) value in the example of the Equation 4.

Furthermore, instead of simply limiting the decreasing level or releasing the limitation of the decreasing level, the controller 20 may determine the aforementioned limitation or release from a map by setting the increasing or decreasing limitation value of the torque compensated amount as the map which is a function of the feedback error signal.

Figure 4:
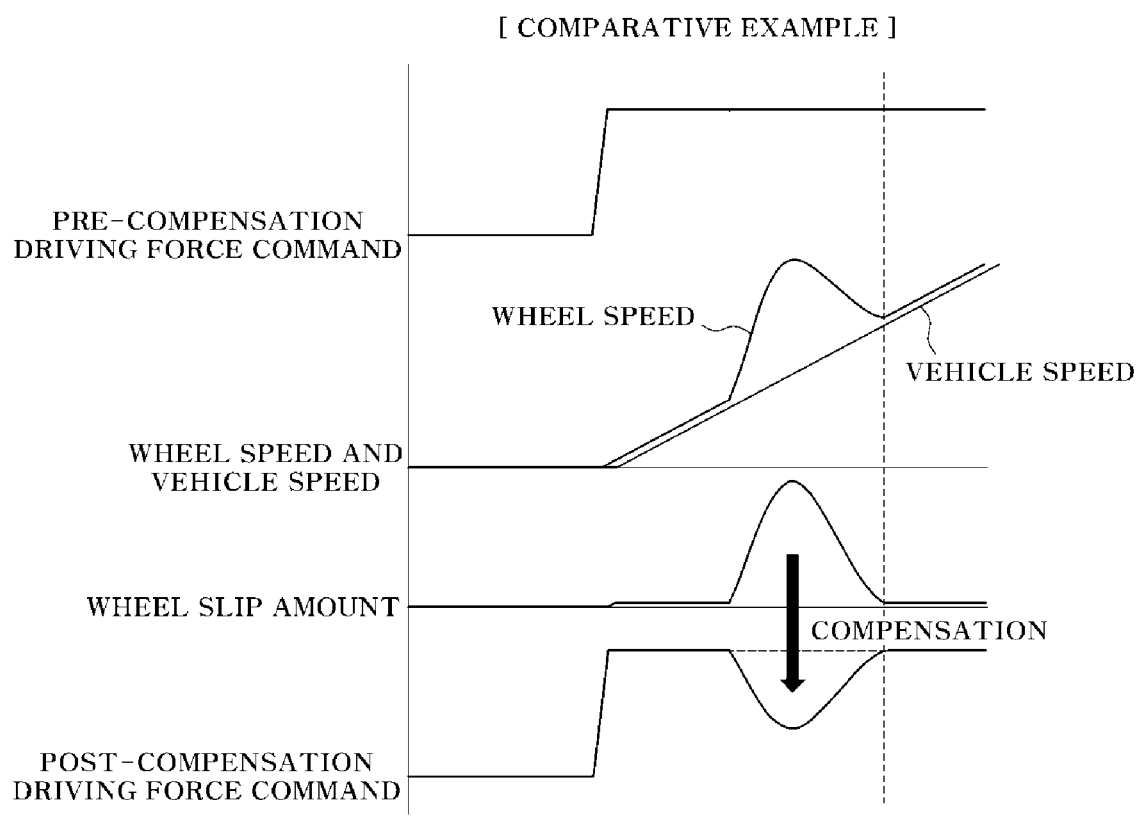
FIGS. 4 and 5 are diagrams separately illustrating control states of a Comparative Example according to the related art and an Example according to the present disclosure.
Figure 5:
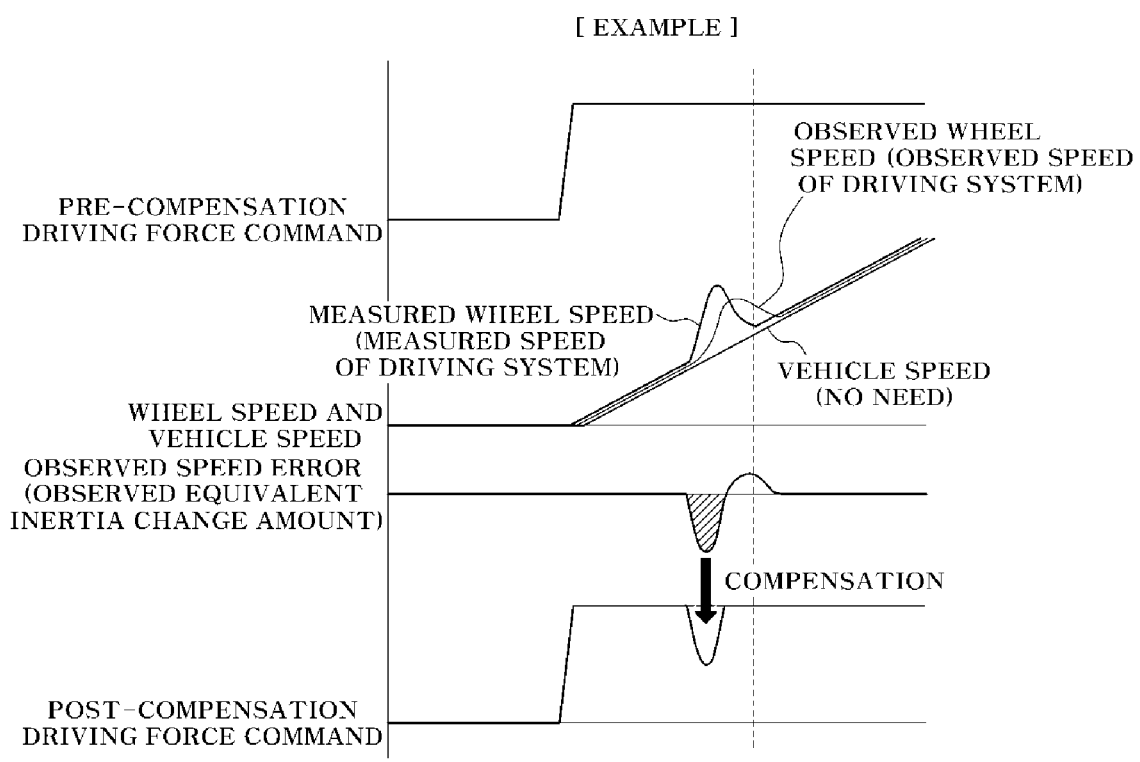

FIGS. 4 and 5 are diagrams separately illustrating control states of a Comparative Example according to the related art and an Example according to the present disclosure. The Comparative Example is an example in which an existing wheel speed difference-based slip limitation control is performed, and the Example is an example in which the equivalent inertia observer-based wheel slip limitation control is performed.

In FIGS. 4 and 5, the top graphs illustrates the pre-compensation driving force (torque) commands; the second graph from the top of FIG. 4 illustrates the wheel speed of the driving wheel and the vehicle speed; and the second graph from the top of FIG. 5 illustrates the measured wheel speed and the observed wheel speed of the driving wheel.

Further, the third graph from the top of FIG. 4 illustrates the wheel slip amount of the driving wheel, and the third graph from the top of FIG. 5 illustrates the speed error (observed equivalent inertia change amount).

Further, the bottom graphs of FIGS. 4 and 5 illustrate the compensated driving force command.

As illustrated in FIG. 4, in the Comparative Example, the driving force command is compensated based on the wheel slip amount generated in the driving wheel.

On the other hand, in the Example, as illustrated in FIG. 5, a control is performed to decrease the driving force by the amount corresponding to the equivalent inertia change amount.

As described above, the equivalent inertial observer-based wheel slip control method of the vehicle according to the present disclosure performs a control in the method for limiting the equivalent inertia change amount of the driving system obtained from the torque and the speed of the driving system, unlike the conventional method for limiting the wheel slip by comparing the actual vehicle speed (reference speed) with the vehicle wheel speed (wheel speed).

Accordingly, first, by measuring and using the speed closer to the driving source (driving device) than the vehicle wheel speed, it is possible to improve the control responsiveness, and to limit the amount of slip in advance before a large amount of wheel slips are generated.

Second, since there is no need for the vehicle speed (reference speed), it is possible to effectively apply the method according to the present disclosure to the four-wheel drive (4WD) vehicle, unlike the conventional method for limiting the slip which has been difficult to be applied to the four-wheel drive (4WD) vehicle.

Further, third, since there is no need for the vehicle speed (reference speed), there is not at all need for the processes such as the left and right wheel speed deviation compensation, the tire rolling radius compensation, the heterogeneous tire sensing and compensation, and the front and rear wheels wheel speed deviation compensation upon turning, which has been required to be performed to obtain the vehicle speed in the conventional control method.

Further, since there is no need for the aforementioned processes, it is not necessary to set the deadzone threshold of the difference between the vehicle speed and the vehicle wheel speed for preventing unnecessary malfunction, thereby leading to improve additional control responsiveness.

Fourth, it is not necessary to perform the wheel speed compensation upon turning, thereby being effective to secure the transverse stability as well as being beneficial to the longitudinal slip rate control responsiveness.

This is the effect based on the fact that as the longitudinal slit rate may be suppressed by the tire friction source principle, the lateral force may be additionally secured upon turning, and provides the effect which alleviates the phenomena of the understeer of the front wheel driving vehicle and the oversteer of the rear wheel driving vehicle.

As described above, although the exemplary embodiments of the present disclosure have been described in detail, the claims of the present disclosure are not limited to the aforementioned exemplary embodiments, and various modifications and improvements by those skilled in the art using the basic concept of the present disclosure defined in the appended claims may also be included the claims of the present disclosure.

What is claimed is:

1. A method for controlling wheel slip of a vehicle, the method comprising:
    observing and estimating, by a controller, equivalent inertia information of a driving system in real time based on operation information of the driving system by receiving the operation information of the driving system for driving the vehicle;
    calculating, by the controller, a compensated amount for compensating a torque command of a driving device from the equivalent inertia information of the driving system observed and estimated by the controller;
    compensating, by the controller, the torque command of the driving device by using the calculated compensated amount; and
    performing, by the controller, a control of a torque applied to a driving wheel according to the compensated torque command;
    wherein the operation information of the driving system is a torque command of a previous control cycle for the driving device which drives the vehicle and speed information of the driving system detected by a speed detector.

2. The method for controlling the wheel slip of the vehicle of claim 1,
    wherein the equivalent inertia information of the driving system for calculating the compensated amount is an equivalent inertia change amount, the equivalent inertia change amount being a difference between an equivalent inertia of the driving system and a predetermined basic equivalent inertia.

3. The method for controlling the wheel slip of the vehicle of claim 1,
    wherein the equivalent inertia information of the driving system for calculating the compensated amount is an inverse equivalent inertia change amount, the inverse equivalent inertia change amount being a difference between an inverse equivalent inertia of the driving system, which is the inverse of the equivalent inertia of the driving system, and a predetermined basic inverse equivalent inertia.

4. The method for controlling the wheel slip of the vehicle of claim 1,
    wherein the equivalent inertia information of the driving system for calculating the compensated amount is one of the equivalent inertia of the driving system, the inverse of the equivalent inertia of the driving system, an error value of the equivalent inertia of the driving system, or a squared value of the equivalent inertia of the driving system.

5. The method for controlling the wheel slip of the vehicle of claim 1, wherein the speed information of the driving system is one of an engine speed, a motor speed, a rotational speed of a transmission input shaft, a rotational speed of a transmission output shaft, or a rotational speed of a starter generator connected to an engine.

6. The method for controlling the wheel slip of the vehicle of claim 1, wherein the observing and estimating, by the controller, of the equivalent inertia information of the driving system in real time based on the operation information of the driving system comprises:
   converting, by an acceleration converter of the controller, the torque command of the previous control cycle into a wheel acceleration;
   obtaining, by a speed converter of the controller, a measured wheel speed by converting the speed of the driving system into a wheel speed;
   calculating, by an error calculator of the controller, a feedback speed error between an observed wheel speed, which is a feedback wheel speed measured value obtained from the wheel acceleration, and the measured wheel speed; and
   obtaining, by a feedback error controller of the controller, the equivalent inertia information of the driving system, which is the real-time observed and estimated value, from the calculated feedback speed error.

7. The method for controlling the wheel slip of the vehicle of claim 6,
   wherein in the converting of the torque command of the previous control cycle into the wheel acceleration,
   the acceleration converter converts the torque command of the previous control cycle into the wheel acceleration by using the input equivalent inertia value or inverse equivalent inertia value by receiving the equivalent inertia value or the inverse equivalent inertia value of the equivalent inertia information obtained by the feedback error controller.

8. The method for controlling the wheel slip of the vehicle of claim 6, further comprising:
   summing, by the controller, the wheel acceleration and a feedback control value by receiving the feedback control value obtained from the feedback speed error as feedback information in the feedback error controller, while receiving the wheel acceleration converted by the acceleration converter as feedforward information; and
   calculating, by the controller, the observed wheel speed, which is the feedback wheel speed observed value, by integrating the acceleration value summed and input by the summer.

9. The method for controlling the wheel slip of the vehicle of claim 8,
   wherein the feedback control value is a feedback control value for converging the observed wheel speed to the measured wheel speed.

10. The method for controlling the wheel slip of the vehicle of claim 6,
    wherein, once it is recognized and determined that a driving wheel is in a wheel slip state when the feedback speed error obtained by the error calculator of the controller is equal to or greater than a predetermined setting value, or out of a predetermined setting range, the controller performs the calculating of the compensated amount, the compensating of the torque command, and the control of the torque according to the compensated torque command.

11. The method for controlling the wheel slip of the vehicle of claim 6,
    wherein in the compensating of the torque command of the driving device,
    the controller decreases the torque command of the driving device by the calculated compensated amount.

12. The method for controlling the wheel slip of the vehicle of claim 6,
    wherein the controller sets the compensated amount by using a function of the feedback speed error.

13. The method for controlling the wheel slip of the vehicle of claim 6,
    wherein the compensated amount is set in the controller by using a function of the feedback speed error calculated by the controller and the equivalent inertia information observed and estimated by the controller.

14. The method for controlling the wheel slip of the vehicle of claim 1,
    wherein a limit value of the equivalent inertia value or the inverse equivalent inertia value is set in the controller, the equivalent inertia value or the inverse equivalent inertial value being the equivalent inertia information observed and estimated by the controller.

15. The method for controlling the wheel slip of the vehicle of claim 14,
    wherein the limit value is set as the equivalent inertia value or the inverse equivalent inertia value based on a maximum acceleration of the vehicle on a flat road.

16. The method for controlling the wheel slip of the vehicle of claim 1,
    wherein in the compensating of the torque command of the driving device,
    the controller decreases the torque command of the driving device by the calculated compensated amount.

* * * * *